(12) United States Patent
Roh

(10) Patent No.: US 9,917,283 B2
(45) Date of Patent: Mar. 13, 2018

(54) RECHARGEABLE BATTERY

(71) Applicant: SAMSUNG SDI CO., LTD., Yongin-si, Gyeonggi-do (KR)

(72) Inventor: Sae-Weon Roh, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 235 days.

(21) Appl. No.: 14/065,463

(22) Filed: Oct. 29, 2013

(65) Prior Publication Data

US 2014/0170473 A1 Jun. 19, 2014

(30) Foreign Application Priority Data

Dec. 18, 2012 (KR) .................. 10-2012-0148089
Feb. 1, 2013 (KR) .................. 10-2013-0011991

(51) Int. Cl.
*H01M 2/02* (2006.01)
*H01M 2/36* (2006.01)
*H01M 10/0566* (2010.01)
*H01M 2/04* (2006.01)
(Continued)

(52) U.S. Cl.
CPC ....... *H01M 2/0217* (2013.01); *H01M 2/0404* (2013.01); *H01M 2/361* (2013.01); *H01M 10/0566* (2013.01); *H01M 10/0569* (2013.01); *H01M 10/05* (2013.01); *H01M 2220/30* (2013.01); *H01M 2300/0025* (2013.01)

(58) Field of Classification Search
CPC .... H01M 2/0217; H01M 2/361; H01M 10/05; H01M 10/0566; H01M 2/0404; H01M 10/0569
See application file for complete search history.

(56) References Cited

U.S. PATENT DOCUMENTS 6,045,944 A 4/2000 Okada et al.
6,503,657 B1 * 1/2003 Takami ............... H01M 2/0275
429/188

(Continued)

FOREIGN PATENT DOCUMENTS

JP 06-150971 A 5/1994
JP 2002-164025 * 6/2002 ............. H01M 2/04
(Continued)

OTHER PUBLICATIONS

"Height." Merriam-Webster.com. Merriam-Webster, n.d. Web. Sep. 28, 2016.*
(Continued)

*Primary Examiner* — Helen O Conley
(74) *Attorney, Agent, or Firm* — Lee & Morse P.C.

(57) ABSTRACT

A rechargeable battery includes an electrode assembly including a first electrode plate, a second electrode plate, and a separator between the first and second electrode plates, an electrolyte having viscosity of about 1 Pa·s to about 15 Pa·s at a temperature from about 20° C. to about 25° C., a can having an opening on one surface through which the electrode assembly is inserted, the electrode assembly and the electrolyte being accommodated inside the can, and a cap plate that seals the opening of the can. A ratio of the height of the can to a cross-sectional area of the can is from about 12.5% to about 25%.

12 Claims, 4 Drawing Sheets

(51) Int. Cl.
   *H01M 10/0569*   (2010.01)
   *H01M 10/05*   (2010.01)

(56) References Cited

U.S. PATENT DOCUMENTS

2002/0061436 A1* 5/2002 Inagaki ............... H01M 2/0212
                                                         429/120
2006/0269842 A1 11/2006 Ichinose et al.
2007/0160904 A1  7/2007 Uh
2010/0035132 A1  2/2010 Park

FOREIGN PATENT DOCUMENTS

| | | |
|---|---|---|
| JP | 2007-188884 A | 7/2007 |
| KR | 10-2004-0042375 A | 5/2004 |
| KR | 10-2009-0088761 A | 8/2009 |

OTHER PUBLICATIONS

Extended European Search Report dated Mar. 21, 2014.
European Examination Report dated Apr. 7, 2016 in Corresponding European Patent Application No. 13198234.0.
Office Action issued by the Chinese Patent Office dated Jan. 3, 2017 in the examination of the Chinese Patent Application No. 201310676185.3.
Office Action issued by the Japanese Patent Office dated Sep. 4, 2017 in the examination of the Japanese Patent Application No. 2013-226490.3.

\* cited by examiner

RECHARGEABLE BATTERY

CROSS-REFERENCE TO RELATED APPLICATIONS

Korean Patent Application No. 10-2012-0148089 filed on Dec. 18, 2012, in the Korean Intellectual Property Office, and entitled: "RECHARGEABLE BATTERY," and Korean Patent Application No. 10-2013-0011991 filed on Feb. 1, 2013, in the Korean Intellectual Property Office, and entitled: "RECHARGEABLE BATTERY," are incorporated by reference herein in their entirety.

BACKGROUND

1. Field

Embodiments relate to a rechargeable battery.

2. Description of the Related Art

As wireless internet and communication technologies have developed, the supply of mobile phones or portable computers operable by using a rechargeable battery instead of a fixed power supply apparatus has rapidly increased. Generally, mobile phones and portable computers are small, are easy to carry, and have excellent mobility. Thus, mobile phones and portable computers are widely used for business or personal use, and accordingly, the demand for rechargeable batteries has been increasing.

SUMMARY

Embodiments are directed to a rechargeable battery including an electrode assembly including a first electrode plate, a second electrode plate, and a separator between the first and second electrode plates, an electrolyte having viscosity of about 1 Pa·s to about 15 Pa·s at a temperature from about 20° C. to about 25° C., a can having an opening which the electrode assembly is inserted, the electrode assembly and the electrolyte being accommodated inside the can, and a cap plate that seals the opening of the can. A ratio of a height of the can to a cross-sectional area of the can is from about 12.5% to about 25%.

The cross-sectional area of the can may be a cross-sectional area in a direction perpendicular to the height of the can.

The cross-sectional area of the can may be from about 210 $mm^2$ to about 560 $mm^2$.

The height of the can may be from about 65 mm to about 110 mm.

A cross-sectional area of the electrode assembly may be about 85% to about 95% of the cross-sectional area of the can.

A height of the electrode assembly may be about 90% to about 98% of the height of the can.

The cap plate may include an electrolyte injection hole.

The rechargeable battery may further include an insulator between the electrode assembly and the cap plate, in the can.

The insulator may include a through hole at a location corresponding to the electrolyte injection hole.

The electrolyte may include a cyclic carbonate-based material, a linear carbonate-based material, and a lithium salt.

Embodiments are also directed to a rechargeable battery, the rechargeable battery including an electrode assembly including a first electrode plate, a second electrode plate, and a separator between the first and second electrode plates, an electrolyte having viscosity of about 1 Pa·s to 15 Pa·s at a temperature from about 20° C. to about 25° C., a can having an opening through which the electrode assembly is inserted, the electrode assembly and the electrolyte being inserted inside the can, and the can having an overall hexahedral shape including a bottom surface parallel to the opening and side surfaces disposed between the opening and the bottom surface, and a cap plate that seals the opening of the can, the cap plate including an electrolyte injection hole into which the electrolyte is injected. A ratio of a height of the can to a cross-sectional area of the can is from about 12.5% to about 25%.

The cross-sectional area of the can may be from about 210 $mm^2$ to about 560 $mm^2$.

The height of the can may be from about 65 mm to about 110 mm.

A cross-sectional area of the electrode assembly may be about 85% to about 95% of the cross-sectional area of the can.

A height of the electrode assembly may be about 90% to about 98% of the height of the can.

The rechargeable battery may further include an insulator in the can between the electrode assembly and the cap plate. The insulator may include a through hole at a location corresponding to the electrolyte injection hole.

The opening of the can sealed by the cap plate may be at a location corresponding to a top surface. The bottom surface may be opposite to the cap plate. The side surfaces may include a first side surface between the cap plate and the bottom surface and approximately perpendicular to the bottom surface, a second side surface between the cap plate and the bottom surface and approximately perpendicular to the bottom surface, and facing the first side surface, a third side surface between the cap plate and the bottom surface and approximately perpendicular to the bottom surface and the first side surface, and a fourth side surface between the cap plate and the bottom surface and approximately perpendicular to the bottom surface, and facing the third side surface.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
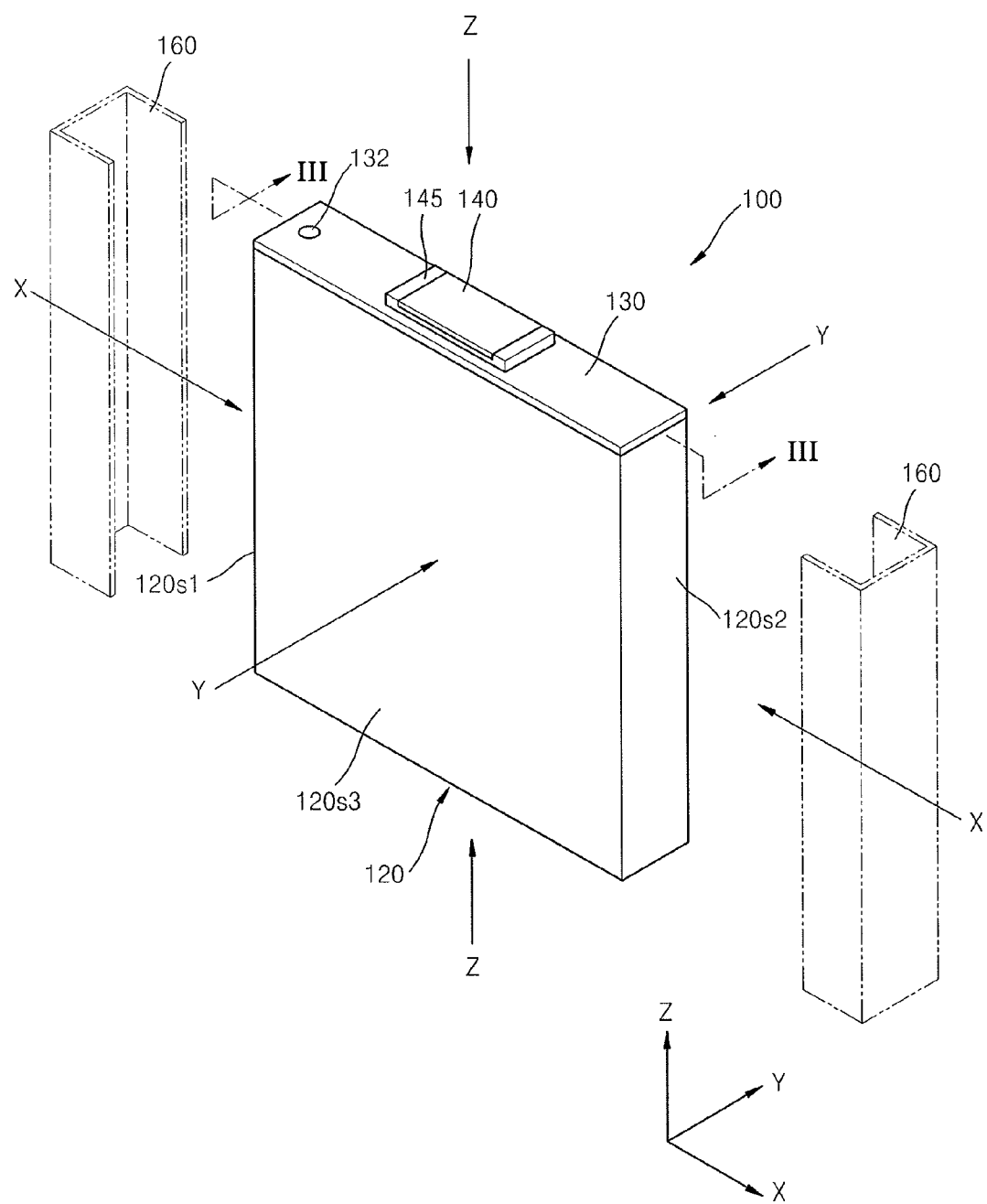
FIG. 1 illustrates a perspective view schematically showing a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As the invention allows for various changes and numerous embodiments, particular embodiments will be illustrated in the drawings and described in detail in the written description. However, this is not intended to limit the present invention to particular modes of practice, and it will to be appreciated that all changes, equivalents, and substitutes that do not depart from the spirit and technical scope are encompassed in the present invention. In the description, certain detailed explanations of related art are omitted when it is deemed that they may unnecessarily obscure the essence of the invention. While such terms as "first," "second," etc., may be used to describe various components, such components must not be limited to the above terms. The above terms are used only to distinguish one component from another. The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. "/" used herein may be interpreted as "and" or "or" according to situations. Also, expressions such as "at least one of," when preceding a list of elements, modify the entire list of elements and do not modify the individual elements of the list.

Figure 2:
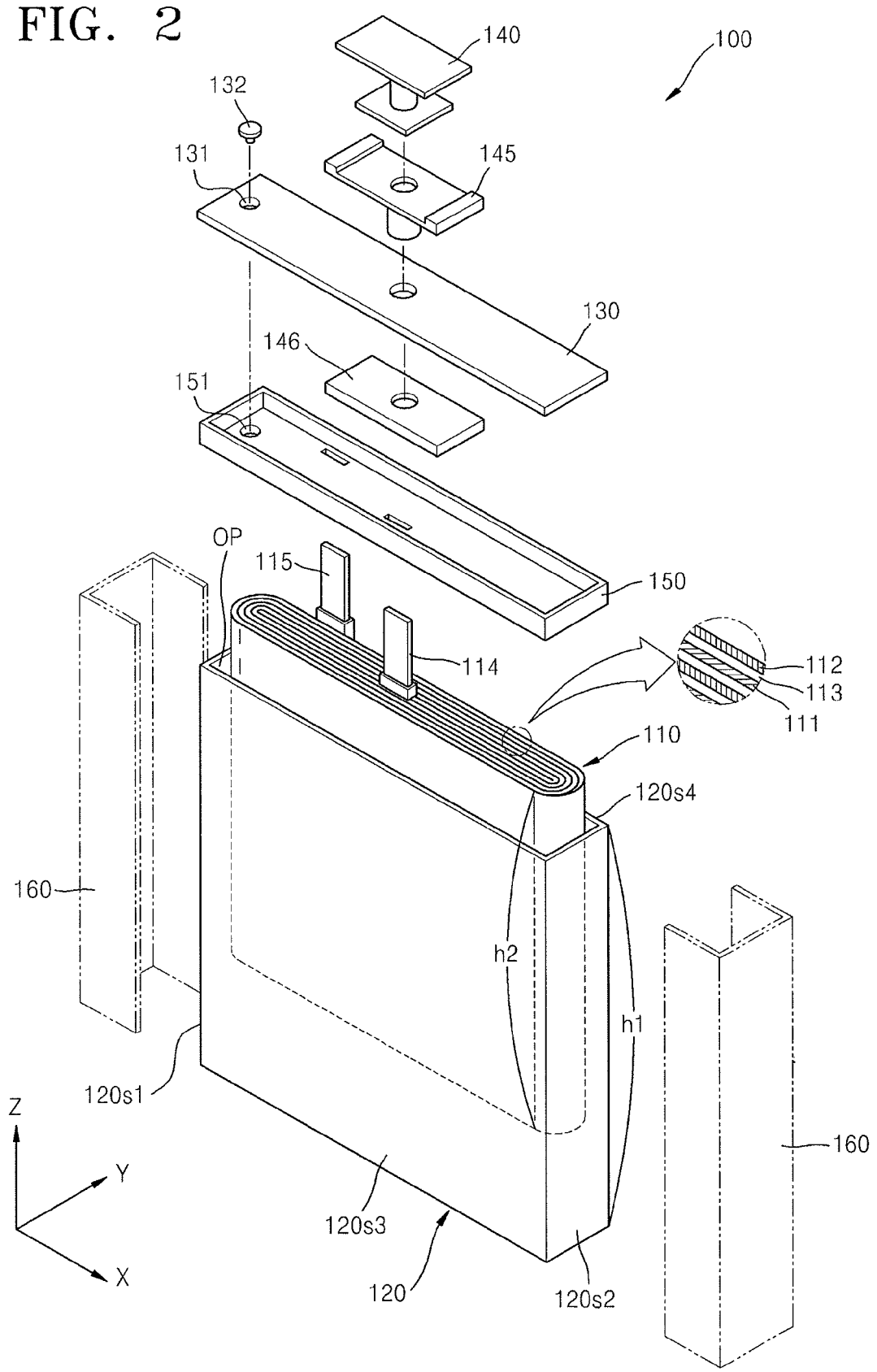
FIG. 2 illustrates an exploded perspective view of FIG. 1.
Figure 3:
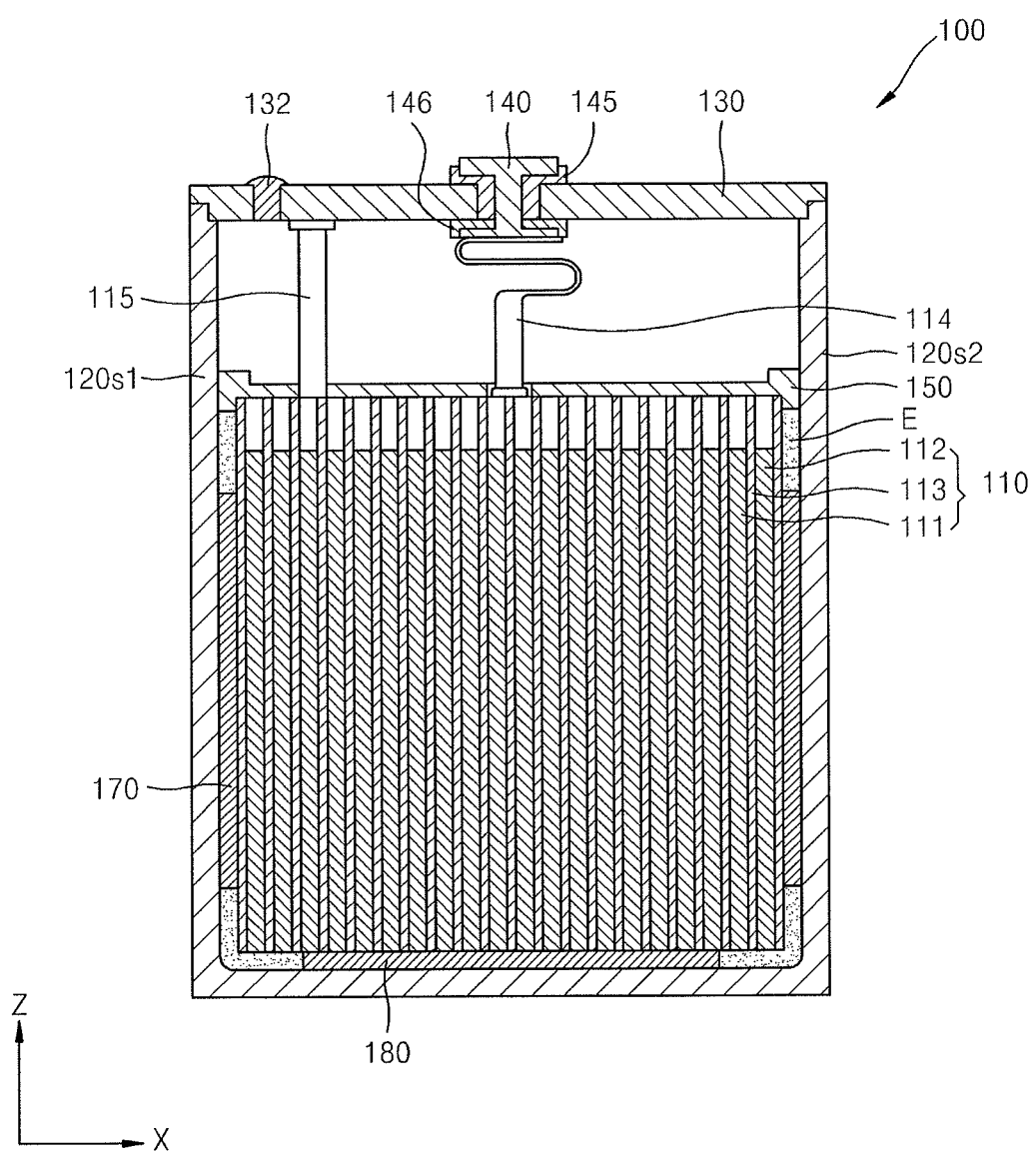
FIG. 3 illustrates a cross-sectional view taken along a line III-III of FIG. 1.
Figure 4:
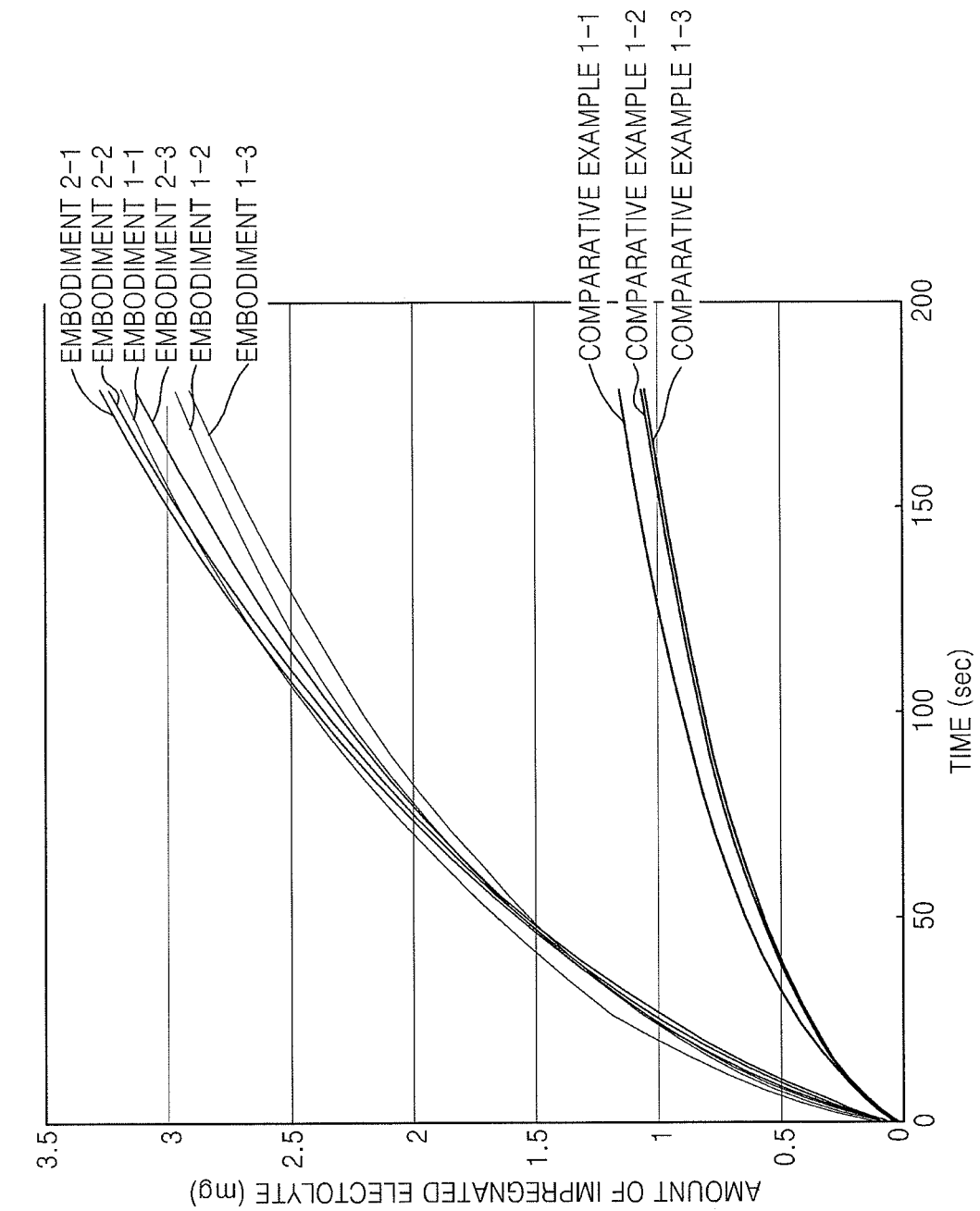
FIG. 4 illustrates a graph showing an amount of impregnated electrolyte of each rechargeable battery according to Embodiments 1-1,1-2, 1-3,2-1, 2-2, and 2-3 and Comparative Examples 1-1, 1-2, and 1-3, with respect to time.

FIG. 1 illustrates a perspective view schematically of a rechargeable battery 100 according to an embodiment. FIG. 2 is an exploded perspective view of FIG. 1. FIG. 3 is a cross-sectional view taken along a line III-III of FIG. 1. FIG. 4 is a graph showing an amount of impregnated electrolyte of each rechargeable battery according to Embodiments 1-1,1-2, 1-3,2-1, 2-2, and 2-3 and Comparative Examples 1-1, 1-2, and 1-3, with respect to time.

In FIG. 1, an X-X direction is a width direction of the rechargeable battery 100, a Y-Y direction is a thickness direction of the rechargeable battery 100, and a Z-Z direction of the rechargeable battery 100 is a height direction of the rechargeable battery 100. A cross-sectional area of the rechargeable battery 100 extends along an XY plane, and a height of the rechargeable battery 100 is in a direction perpendicular to the cross-sectional area, i.e., in a direction (the Z-Z direction) perpendicular to the thickness direction.

Referring to FIGS. 1 through 3, the rechargeable battery 100 according to an embodiment has a thin thickness. For example, the rechargeable battery may have a thickness that is less than or equal to about 8 mm. In detail, the thickness of the rechargeable battery 100 may be less than or equal to about 7 mm. The rechargeable battery 100 may include an electrode assembly 110, an electrolyte E, a can 120 accommodating the electrolyte E and the electrode assembly 110, a cap plate 130 sealing inside the can 120, and a first insulator 150.

The electrode assembly 110 may include a first electrode plate 111 and a second electrode plate 112, on which an electrode active material is coated, and a separator 113 disposed between the first and second electrode plates 111 and 112. The electrode assembly 110 may be manufactured by forming a stacked structure wherein the first electrode plate 111, the separator 113, and the second electrode plate 112 are sequentially stacked in the stated order, and then winding the stacked structure in a jelly roll shape. The first and second electrode plates 111 and 112 may be respectively electrically connected to a first electrode tab 114 and a second electrode tab 115 for externally drawing out electrical charges formed via a chemical reaction. The first and second electrode tabs 114 and 115 may extend towards the same direction. For example, the first and second electrode tabs 114 and 115 may extend towards an opening OP of the can 120.

In the current embodiment, the electrode assembly 110 may a jelly roll shape. In other implementations, the electrode assembly 110 may have a stacked structure wherein the first electrode plate 111, the separator 113, and the second electrode plate 112 are stacked in the stated order.

The electrolyte E may have a viscosity of about 1 Pa·s to about 15 Pa·s at a temperature from about 20° C. to about 25° C. For example, the electrolyte E may include a cyclic carbonate-based material, a linear carbonate-based material, and a lithium salt. The electrolyte E may include at least one of ethylene carbonate (EC), propylene carbonate (PC), vinylene carbonate (VC), and vinyl ethylene carbonate (VEC) as the cyclic carbonate-based material. The electrolyte E may include at least one of ethyl methyl carbonate (EMC), dimethyl carbonate (DMC), and diethyl carbonate (DEC) as the linear carbonate-based material. The electrolyte E may include at least one of $LiPF_6$ and $LiBF_4$ as the lithium salt. In other implementations, the electrolyte E may include at least one selected from the group of $LiPF_6$, $LiBF_4$, $LiAsF_6$, $LiClO_4$, $LiCF_3SO_3$, $LiC(SO_2CF_3)_3$, $LiN(CF_3SO_2)_2$, and $LiCH(CF_3SO_2)_2$ as the lithium salt.

The can 120 may have a hexahedral shape, wherein a surface corresponding to a top surface is opened. The can 120 may be formed of a metallic material so as to provide strength. As shown in FIG. 2, the can 120 may include the opening OP at a location corresponding to the top surface. The can 120 may further include a bottom surface 120bt opposite to the opening OP, and first through fourth side surfaces 120s1, 120s2, 120s3, and 120s4, which are disposed between the opening OP and the bottom surface 120bt and are perpendicularly bent with respect to the bottom surface 120bt. The first and second side surfaces 120s1 and 120s2 may be parallel to each other and disposed opposite to each other. The third and fourth side surfaces 120s3 and 120s4 may be parallel to each other and disposed opposite to each other. The can 120 may have an approximate hexahedral shape. Widths of the first and second side surfaces 120s1 and 120s2 may be smaller than widths of the third and fourth side surfaces 120s3 and 120s4.

The electrolyte E, and the electrode assembly 110 impregnated in the electrolyte E may be accommodated in the can 120. The electrode assembly 110 may be accommodated in the can 120 while being surrounded by an insulating sheet 170 in order to prevent an undesirable short circuit with the can 120, particularly if the can 120 is formed of a metallic material. After the electrode assembly 110 is accommodated in the can 120, the opening OP may be sealed by the cap plate 130. A region where the cap plate 130 and the can 120 contact each other may be combined via laser welding so as to seal the can 120 and maintain internal air-tightness.

The cap plate 130 may include an electrolyte injection hole 131. After the cap plate 130 and the can 120 are combined, the electrolyte E may be injected through the electrolyte injection hole 131, and then the electrolyte injection hole 131 may be sealed by a stopper 132.

An electrode terminal 140 may be disposed on the cap plate 130. A top surface of the electrode terminal 140 may be externally exposed through a top of the cap plate 130. A bottom of the electrode terminal 140 may face the inside of the can 120 through the cap plate 130.

The cap plate 130 may be formed of a metallic material. As shown in FIG. 3, the electrode terminal 140 may be electrically connected to the first electrode tab 114 of the electrode assembly 110 to provide a first polarity. The cap plate 130 may be electrically connected to the second electrode tab 115 of the electrode assembly 110 to provide a second polarity. If the can 120 is connected to the can plate 130 via welding, for example, the can 120 may also provide the second polarity.

For example, the cap plate 130 may operate as a positive electrode of the rechargeable battery 100, and the electrode terminal 140 may operate as a negative electrode of the rechargeable battery 100. A first gasket 145 and a second gasket 146, which include an insulator, may be used to prevent a short between the cap plate 130 and the electrode terminal 140. The first gasket 145 may be disposed to contact a top surface of the cap plate 130, and the second gasket 146 may be disposed to contact a bottom surface of the cap plate 130. In FIG. 2, the first and second gaskets 145 and 146 are shown as being individual members. In other implementations, the first and second gaskets 145 and 146 may be integrated to each other. An insulating film 160 covering the first and second side surfaces $120s1$ and $120s2$ of the can 120 may be adhered to the can 120 in order to electrically insulate the can 120 from an external object. As noted above, the can 120 may have the second polarity due to welding or other electrical connection with the cap plate 130.

The first insulator 150 may be located on the electrode assembly 110 in the can 120. The first insulator 150 may insulate the electrode assembly 110 from the cap plate 130. The first insulator 150 may insulate the electrode assembly 110 from the cap plate 130 while restricting the electrode assembly 110 from moving inside the can 120. The first insulator 150 may include a through hole such that the first and second electrode tabs 114 and 115 extend towards the opening OP, and may include a hole 151 at a location corresponding to the electrolyte injection hole 131 such that the electrolyte E injected through the electrolyte injection hole 131 may pass therethrough. A second insulator 180 may be disposed below the electrode assembly 110 so as to prevent an undesirable short circuit between the can 120 and the electrode assembly 110, which may include metallic materials.

The thickness of the rechargeable battery 100 according to an embodiment may be less than or equal to about 8 mm. For example, the thickness of the rechargeable battery 100 may be less than or equal to about 7 mm. The rechargeable battery 100 having such a small thickness may have following structure and conditions in order to increase an impregnation efficiency of the electrolyte E.

For example, the can 120 may have an approximate hexahedral shape. When the electrode assembly 110 and the electrolyte E are accommodated in the can 120, a ratio of a height h1 of the can 120 to a cross-sectional area Ac of the can 120 may satisfy at least one of following conditions. The cross-sectional area Ac of the can 120 denotes a cross-sectional area in a direction perpendicular to the height of the can 120, i.e., a cross-sectional area of the can 120 according to an XY plane. The cross-sectional area Ac is computed according to square units using the same unit of measurement used to determine the height h1. Thereafter, the units of measurement are dropped in computing the ratio of the height h1 of the can 120 to the cross-sectional area Ac and in converting the ratio into a percent value.

$$12.5\% \leq h1/Ac \leq 25\% \qquad \text{<Condition 1>}$$

Condition 1 defines the ratio of the height h1 of the can 120 to the cross-sectional area Ac of the can 120. When Condition 1 is satisfied, the impregnation efficiency of the electrode assembly 110 in the electrolyte E having viscosity of about 1 Pa·s to about 15 at a temperature from about 20° C. to about 25° C. may be increased. If h1/Ac is less than 12.5% or higher than 25%, impregnation speed and efficiency of the electrode assembly 110 with respect to the electrolyte E may be decreased, and thus the rechargeable battery 100 may not provide sufficient performance.

FIG. 4 is a graph showing an amount of impregnated electrolyte of each rechargeable battery according to Embodiments 1-1,1-2, 1-3,2-1, 2-2, and 2-3 and Comparative Examples 1-1, 1-2, and 1-3, with respect to time. In FIG. 4, thicknesses of the rechargeable batteries according to Embodiments 11-1,1-2, 1-3,2-1, 2-2, and 2-3 and Comparative Examples 1-1, 1-2, and 1-3 were the same and were less than or equal to 8 mm. Embodiments 1-1,1-2, 1-3,2-1, 2-2, and 2-3 satisfied Condition 1, whereas Comparative Examples 1-1, 1-2, and 1-3 did not satisfy Condition 1.

The rechargeable batteries according to Embodiments 1-1, 1-2, and 1-3 had a cross-sectional area of 354 mm$^2$ and a height of 80 mm, providing a value for Condition 1 of about 22.60%. The rechargeable batteries according to Embodiments 2-1, 2-2, and 2-3 had a cross-sectional area of 270 mm$^2$ and a height of 65 mm, providing a value for Condition 1 of about 24.07%. On the other hand, the rechargeable batteries according to Comparative Examples 1-1, 1-2, and 1-3 had a cross-sectional area of 170 mm$^2$ and a height of 80 mm, providing a value for Condition 1 of about 47.06%.

Referring to FIG. 4, the amounts of impregnated electrolyte of Embodiments 1-1, 1-2, and 1-3,2-1, 2-2, and 2-3 were about 2.8 to about 3.4 mg after about 150 seconds, whereas the amounts of impregnated electrolyte of Comparative Examples 1-1, 1-2, and 1-3 were about 1.0 to about 1.3 mg after about 150 seconds. The amounts of impregnated electrolyte of Embodiments 1-1,1-2, 1-3,2-1, 2-2, and 2-3 satisfying Condition 1 were about 3 times the amounts of impregnated electrolyte of Comparative Examples 1-1, 1-2, and 1-3 which did not Condition 1, with respect to the same amount of time.

According to an embodiment, the cross-sectional area Ac of the can 120 may be from about 210 mm$^2$ to about 560 mm$^2$, and the height h1 of the can 120 may be from about 65 mm to about 110 mm. If the height h1 is less than 65 mm, the rechargeable battery 100 may not have a sufficient output even for a small device, such as a mobile phone. Accordingly, such a rechargeable battery may be undesirable. On the other hand, if the height h1 is higher than 110 mm, the impregnation efficiency of the electrode assembly 110 in the electrolyte E may be decreased.

The electrode assembly 110 accommodated in the can 120 satisfying Condition 1 may increase the impregnation efficiency of the electrolyte E when Condition 2 is satisfied.

$$85\% \leq Ae/Ac \leq 95\% \qquad \text{<Condition 2>}$$

Condition 2 defines a ratio of a cross-sectional area Ae of the electrode assembly 110 to the cross-sectional area Ac of the can 120. When Ae/Ac is lower than 85%, energy density and output (Wh) of the rechargeable battery 100 may be low. When Ae/Ac is higher than 95%, the impregnation efficiency may be decreased and it may be difficult to accommodate an amount of the electrolyte E sufficient for an operation of the rechargeable battery 100 that is repeatably charged and discharged for a long period of time.

A height h2 of the electrode assembly 110 may satisfy Condition 3 below.

$$90\% \leq h2/h1 \leq 98\% \qquad \text{<Condition 3>}$$

Condition 3 defines a ratio of the height h2 of the electrode assembly 110 to the height h1 of the can 120. When h2/h1 is lower than 90%, the energy density of the rechargeable battery 100 may be decreased and the electrode assembly 110 may move inside the can 120. Safety of the rechargeable battery 100 may be threatened when the rechargeable battery 100 is dropped or the like. When h2/h1 is higher than 98%, assembling of the rechargeable battery 100 may be difficult, and thus, safety and reliability of the rechargeable battery 100 may be decreased.

As described above, according to the one or more of the above embodiments, an impregnation efficiency of an electrolyte having viscosity of 1 Pa·s to 15 Pa·s may be increased at a temperature from 20° C. to 25° C.

By way of summation and review, as the performance of electronic devices, such as mobile phones and portable computers, has gradually improved, high energy performance, for example, high performance in terms of energy density/output, is becoming more desirable in rechargeable batteries. In addition, it is becoming desirable for the thickness of rechargeable batteries used in the such electronic devices to be reduced to be compatible with slimmer electronic devices.

In order to provide a high energy density and/or high output, the rechargeable battery should sufficiently include an electrode assembly and an electrolyte. However, it may be difficult to make electronic devices slimmer if the rechargeable battery is expected to have a high performance. At the same time, it may be difficult to manufacture a rechargeable battery to have a high performance if the electronic devices are made to be slimmer.

One or more embodiments include a rechargeable battery having a thin thickness, and more particularly, a rechargeable battery that increases an impregnation efficiency of an electrolyte.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A rechargeable battery comprising:
an electrode assembly including a first electrode plate, a second electrode plate, and a separator between the first and second electrode plates;
an electrolyte having viscosity of about 1 Pa·s to about 15 Pa·s at a temperature from about 20° C. to about 25° C.;
a can having an opening through which the electrode assembly is inserted, the electrode assembly and the electrolyte being accommodated inside the can, the can extending in a first direction and a second direction, orthogonal to the first direction; and
a cap plate that seals the opening of the can,
wherein a ratio of a height of the can along the first direction to a cross-sectional area of the can perpendicular to the height of the can is from about 12.5% to about 25%, the height of the can is from about 65 mm to about 110 mm, and a thickness of the can along the second direction is less than or equal to 7 mm,
wherein the can further includes a bottom surface opposite to the opening, and the first direction is from the bottom surface to the opening, and
wherein a cross-sectional area of the electrode assembly perpendicular to the height of the can is about 85% to about 95% of the cross-sectional area of the can perpendicular to the height of the can.

2. The rechargeable battery as claimed in claim 1, wherein the cross-sectional area of the can perpendicular to the height of the can is from about 270 mm² to about 560 mm².

3. The rechargeable battery as claimed in claim 1, wherein a height of the electrode assembly is about 90% to about 98% of the height of the can.

4. The rechargeable battery as claimed in claim 1, wherein the cap plate includes an electrolyte injection hole.

5. The rechargeable battery as claimed in claim 4, further comprising an insulator in the can between the electrode assembly and the cap plate.

6. The rechargeable battery as claimed in claim 5, wherein the insulator includes a through hole at a location corresponding to the electrolyte injection hole.

7. The rechargeable battery as claimed in claim 1, wherein the electrolyte includes a cyclic carbonate-based material, a linear carbonate-based material, and a lithium salt.

8. A rechargeable battery comprising:
an electrode assembly including a first electrode plate, a second electrode plate, and a separator between the first and second electrode plates;
an electrolyte having viscosity of about 1 Pa·s to 15 Pa·s at a temperature from about 20° C. to about 25° C.;
a can having an opening through which the electrode assembly is inserted, the electrode assembly and the electrolyte being inserted inside the can, and the can having an overall hexahedral shape including a bottom surface parallel to the opening and side surfaces disposed between the opening and the bottom surface, the side surfaces extending along a first direction; and
a cap plate that seals the opening of the can, the cap plate including an electrolyte injection hole into which the electrolyte is injected,
wherein a ratio of a height of the can along the first direction to a cross-sectional area of the can perpendicular to the height of the can is from about 12.5% to about 25%, the height of the can is from about 65 mm to about 110 mm, and a thickness of the can along a second direction, orthogonal to the first direction, is less than or equal to 7 mm,
wherein the first direction is from the bottom surface to the opening, and
wherein a cross-sectional area of the electrode assembly perpendicular to the height of the can is about 85% to about 95% of the cross-sectional area of the can perpendicular to the height of the can.

9. The rechargeable battery as claimed in claim 8, wherein the cross-sectional area of the can perpendicular to the height of the can is from about 270 mm² to about 560 mm².

10. The rechargeable battery as claimed in claim 8, wherein a height of the electrode assembly is about 90% to about 98% of the height of the can.

11. The rechargeable battery as claimed in claim 8, further comprising an insulator in the can between the electrode assembly and the cap plate, the insulator including a through hole at a location corresponding to the electrolyte injection hole.

12. The rechargeable battery as claimed in claim 8, wherein:

the opening of the can sealed by the cap plate is at a location corresponding to a top surface, the bottom surface is opposite to the cap plate, and the side surfaces include:

a first side surface between the cap plate and the bottom surface and approximately perpendicular to the bottom surface;

a second side surface between the cap plate and the bottom surface and approximately perpendicular to the bottom surface, and facing the first side surface;

a third side surface between the cap plate and the bottom surface and approximately perpendicular to the bottom surface and the first side surface; and a fourth side surface between the cap plate and the bottom surface and approximately perpendicular to the bottom surface, and facing the third side surface.

* * * * *